United States Patent
Schneider

(10) Patent No.: US 6,382,144 B1
(45) Date of Patent: May 7, 2002

(54) COOLING DEVICE FOR AN INTERNAL COMBUSTION ENGINE

(75) Inventor: Klaus Schneider, Tiefenbronn (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 09/659,039

(22) Filed: Sep. 11, 2000

(30) Foreign Application Priority Data

Sep. 9, 1999 (DE) .......................................... 199 43 002

(51) Int. Cl.⁷ .................................................. F01P 3/00
(52) U.S. Cl. .............................. 123/41.29; 123/41.33; 123/41.51; 180/68.4
(58) Field of Search ........................... 123/41.29, 41.28, 123/41.51, 54.6, 54.7, 41.72, 41.33; 165/41; 180/68.4

(56) References Cited

U.S. PATENT DOCUMENTS

| | | | |
|---|---|---|---|
| 3,770,049 A | 11/1973 | Wright | 165/41 |
| 4,723,594 A | 2/1988 | Koehr et al. | 165/44 |
| 4,953,631 A | 9/1990 | Kimura | 165/41 |
| 5,503,117 A | * 4/1996 | Saito | |
| 5,915,490 A | 6/1999 | Würfel | 180/68.1 |

FOREIGN PATENT DOCUMENTS

| | | | |
|---|---|---|---|
| DE | 36 11 713 | 5/1987 | |
| DE | 39 30 076 | 2/1991 | |
| DE | 689 12 897 | 8/1994 | |
| DE | 196 02 186 | 5/1997 | |
| DE | 199 37 604 | 2/2000 | |
| EP | 637680 | * 2/1995 | .............. 123/41.28 |
| JP | 6-239147 | 8/1994 | |
| SU | 577304 | * 10/1977 | .............. 123/41.51 |

* cited by examiner

*Primary Examiner*—Noah P. Kamen
(74) *Attorney, Agent, or Firm*—Crowell & Moring, LLP

(57) ABSTRACT

A cooling device for an internal combustion engine is installed in a motor vehicle, especially in a passenger car. The cooling device has several radiators, which are disposed in a front section of the passenger car and connected over pipelines with the internal combustion engine. For reasons of space and to improve the effect, the cooling device in the front section, comprises a radiator, which extends transversely to the longitudinal direction of the vehicle, and two lateral radiators, which extend obliquely to a longitudinal central plane. Through the agency of a collecting device with cooling water outlet pipelines, the radiators are connected to a common supplying pipeline, which is connected with the internal combustion engine. Moreover, downstream from the internal combustion engine, there is a returning pipeline, which is connected with a branching device, from which the cooling water-returning pipelines lead to the radiators.

10 Claims, 1 Drawing Sheet

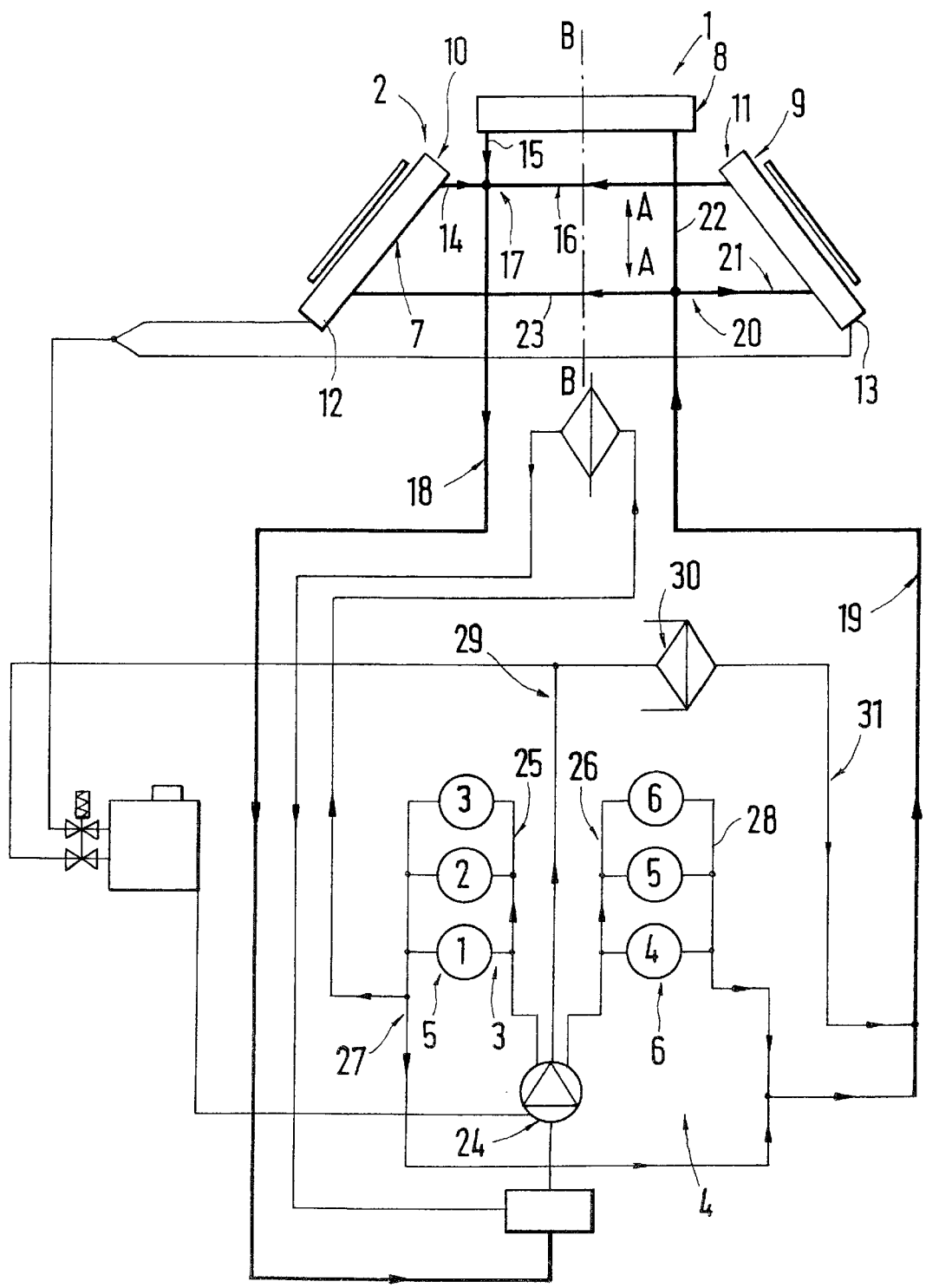

COOLING DEVICE FOR AN INTERNAL COMBUSTION ENGINE

BACKGROUND AND SUMMARY OF THE INVENTION

This application claims the priority of German application DE 199 43 002.0, filed in Germany on Sep. 9, 1999, the disclosure of which is expressly incorporated by reference herein.

This invention relates to a cooling device for an internal combustion engine installed in a motor vehicle such as a passenger car. The cooling device has several radiators, which are disposed in the front section of the passenger car and connected with the internal combustion engine by pipelines.

A cooling device of the type mentioned above is known from German Patent Document DE 39 30 076 C1. This cooling device is disposed in the front space of a motor vehicle and, moreover, as seen in the driving direction, in front of a cooling fan driven by an internal combustion engine. The cooling device comprises two radiators; one radiator is disposed obliquely in the front space of the motor vehicle, and the other radiator is disposed upright.

In German Patent Document DE 36 11 713 C1, a cooling device in a motor vehicle which has a radiator and a secondary radiator is described. The two radiators are at a distance from one another and are disposed upright in the front space of the motor vehicle.

It is an object of the invention to provide a cooling device for a motor vehicle which comprises several radiators, is highly effective, and can be installed in the front section of the motor vehicle in a justifiable space.

This object is accomplished by a particular cooling device for an internal combustion engine, installed in a motor vehicle such as a passenger car, which has several radiators. The cooling device is disposed in the front section of the passenger car and connected with the internal combustion engine by pipelines such that the cooling device in the front section has one radiator extending transversely to the longitudinal direction of the vehicle and two lateral radiators extending obliquely to a central longitudinal plane. By way of a collecting device, the radiators are connected with cooling water outlet pipelines at a common supplying pipeline connected with the internal combustion engine. Downstream from the internal combustion engine, there is a returning pipeline, which is connected with a branching device, from which the cooling water-supplying pipelines run to the radiators.

The main advantages achieved by the invention, in which the cooling device has three radiators, are that the front space is well utilized and that an efficient cooling performance for the internal combustion engine is enclosed. The cooling water outlet pipelines, the collecting device, the supplying pipeline, the returning pipeline, the branching device, and the cooling water-returning pipelines make a properly functioning cooling water cycle possible for an internal combustion engine disposed in the front, in the rear, or close to the rear (in a mid-engine construction) of a motor vehicle. The cylinder-supplying pipelines extend from the water pump in a clear manner to the rows of cylinders. Finally, an auxiliary supplying pipeline, by which the heat exchanger is supplied for cooling the engine oil, comes from the water pump. This heat exchanger cooling, which acts independently of the cylinders, ensures a uniform supply of cooling water to the two rows of cylinders.

Other advantages, features, and details of the invention will be found in the description below in which a number of embodiments of the invention are described in detail with reference to the drawings. The features referred to in the claims and the specification may be important to the invention individually or in any combination.

BRIEF DESCRIPTION OF THE DRAWING

The single drawing FIGURE is a diagrammatic view of part of a motor vehicle, from above, showing a cooling assembly constructed according to a preferred embodiment of the invention.

DETAILED DESCRIPTION OF THE INVENTION

In the front section 1 of a motor vehicle, the details of which are not shown, a cooling device 2 for an internal combustion engine 3 is provided. The internal combustion engine 3 may be disposed in the rear end 4 or, in mid-engine construction, adjacent to the rear end of the motor vehicle, and has opposite rows of cylinders 5 and 6. The cooling device is formed by several radiators 7, 8 and 9. Radiator 8 extends transversely to the longitudinal direction A—A of the vehicle, and radiators 7 and 9 extend obliquely to a central longitudinal plane B—B of the vehicle in such a manner that, with their front sides 10, 11, they are closer to the central longitudinal plane B—B than they are with their rear sides 12, 13.

The radiators 7, 8 and 9 are connected with cooling water outlet pipelines 14, 15 and 16 to a collecting device 17, which is connected through the agency of a supplying pipeline 18 with the cylinders of the rows 5, 6 of cylinders of the internal combustion engine 3.

A returning pipeline 19, which leads to a branching device 20, is connected downstream from the cylinders of the internal combustion engine 3. Cooling water-returning pipelines 21, 22 and 23 are placed between the branching device 20 and the radiators 7, 8 and 9. In the example shown, the cooling water outlet pipelines 14, 15 and 16 and the collecting device 17 are disposed adjacent to the radiator 8; the cooling water pipelines 14, 15 and 16 and the branching device 20 are disposed at a distance therefrom. A water pump 24, which ensures circulation of the cooling water between the cooling device 2 and the rows of cylinders, is connected in the supplying pipeline 18. Moreover, downstream behind the water pump 24, separate cylinder-supplying pipelines 25 and 26 are provided. Cooling medium flows by way of these separate cylinder-supplying pipelines to the individual cylinders of the rows 5, 6 of cylinders. The cylinder-supplying pipelines 25 and 26 extend between the rows 5, 6 of cylinders. Outside of the rows 5, 6 of cylinders, that is, on the side averted from the cylinder-supplying pipelines 25 and 26, water cooling outlet pipelines 27 and 28 are placed, which are connected with the returning pipeline 19.

Leading away from the water pump 24, there is a secondary supplying pipeline 29, which is connected with a heat exchanger 30 for cooling engine oil. On a side of the heat exchanger 30, averted from the secondary pipeline 29, a cooling water outlet pipeline 31, which is connected with a returning pipeline 19, is provided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cooling device for an internal combustion engine, installed in a motor vehicle, comprising:

several radiators, which are disposed in a front section of the motor vehicle and connected with the internal combustion engine by pipelines, the radiators including one central radiator extending transversely to a longitudinal direction of the vehicle and two lateral radiators extending obliquely to a central longitudinal plane of the vehicle, a collecting device by which the radiators are connected with cooling water outlet pipelines at a common supplying pipeline connected with the internal combustion engine, and a branching device connected with a returning pipeline located downstream from the internal combustion engine, wherein cooling water-returning pipelines run to the radiators from said branching device.

2. The cooling device of claim 1, wherein the cooling water outlet pipelines and the collecting device are adjacent to the central radiator, whereas the cooling water-returning pipelines and the branching device are at a distance from the cooling water outlet pipelines and the collecting device.

3. The cooling device of claim 2, for use in an internal combustion engine with opposite rows of cylinders and a water pump pumping cooling water of the cooling device, wherein the common supplying pipeline is connected to the water pump and separate cylinder supplying pipelines for the rows of cylinders are provided downstream behind the water pump and extend between the rows of the cylinders.

4. The cooling device of claim 3, wherein the returning pipeline is connected with respective cooling water outlet pipelines placed outside.

5. The cooling device of claim 1, for use in an internal combustion engine with opposite rows of cylinders and a water pump pumping cooling water of the cooling device, wherein the common supplying pipeline is connected to the water pump and separate cylinder supplying pipelines for the rows of cylinders are provided downstream behind the water pump and extend between the rows of the cylinders.

6. The cooling device of claim 5, wherein the returning pipeline is connected with respective cooling water outlet pipelines placed outside of the respective rows of the cylinders.

7. The cooling device of claim 3, wherein a secondary supplying pipeline, which is connected with a heat exchanger, leads away from the water pump.

8. The cooling device of claim 7, wherein the heat exchanger is constructed for cooling engine oil of the internal combustion engine.

9. The cooling device of claim 7, wherein the heat exchanger comprises a cooling water outlet pipeline, which is connected to the returning pipeline.

10. A vehicle engine assembly comprising:

a combustion engine, a first radiator extending transversely of a vehicle longitudinal center line, second and third radiators extending at respective opposite sides of and obliquely to the longitudinal center line, respective coolant outlet pipelines leading away from the radiators to a collecting device which leads to a common supplying pipeline connected with the combustion engine, and a common returning pipeline leading away from the combustion engine to a branching device which connects with respective coolant returning pipelines leading to the respective radiators.

* * * * *